United States Patent

Arcona et al.

[11] Patent Number: 5,967,878
[45] Date of Patent: Oct. 19, 1999

[54] LAPPING METHOD AND SYSTEM FOR COMPENSATING FOR SUBSTRATE BOW

[75] Inventors: Christopher Arcona, Campbell; Robert Owen Barr, San Jose; Alain Michel Desouches, Santa Cruz; Jeffrey Paul Gunder, San Jose; Douglas Jeffery Lucken, San Jose; Michael Zung, San Jose, all of Calif.

[73] Assignee: International Business Machines Corporation, Armonk, N.Y.

[21] Appl. No.: 08/842,940

[22] Filed: Apr. 25, 1997

[51] Int. Cl.⁶ .................................................. B24B 49/10
[52] U.S. Cl. .................................................. 451/5; 451/11
[58] Field of Search ........................... 451/1, 5, 10, 11; 29/603.15, 603.16

[56] References Cited

U.S. PATENT DOCUMENTS

| | | | |
|---|---|---|---|
| 3,685,216 | 8/1972 | Frey et al. ................................. | 51/325 |
| 4,457,114 | 7/1984 | Hennenfent et al. ................... | 51/216 R |
| 4,536,992 | 8/1985 | Hennenfent et al. ................... | 51/109 R |
| 4,675,986 | 6/1987 | Yen ........................................... | 29/603 |
| 4,912,883 | 4/1990 | Chang et al. ............................ | 451/1 |
| 4,914,868 | 4/1990 | Church et al. ........................... | 51/165.71 |
| 5,117,589 | 6/1992 | Bischoff et al. ........................ | 51/216 A |
| 5,203,119 | 4/1993 | Cole ........................................ | 51/165 |
| 5,266,769 | 11/1993 | Deshpande et al. ................... | 219/121.69 |
| 5,361,547 | 11/1994 | Church et al. ........................... | 451/5 |
| 5,386,666 | 2/1995 | Cole ........................................ | 451/5 |
| 5,468,177 | 11/1995 | Kindler et al. .......................... | 451/364 |
| 5,525,091 | 6/1996 | Lam et al. ............................... | 451/1 |
| 5,624,298 | 4/1997 | Yumoto ................................... | 451/5 |

OTHER PUBLICATIONS

"Slider Air–Bearing Surface Crown Control through Transfer Tool Design", IBM Technical Disclosure Bulletin, Vo. 38, No. 06, Jun. 1995, pp. 167–168.

*Primary Examiner*—Robert A. Rose
*Attorney, Agent, or Firm*—Robert B. Martin

[57] ABSTRACT

A method and system is disclosed for lapping row edges of a substrate work piece with a flat lapping element. The substrate work piece comprises a section of wafer having parallel aligned multiple row edges to be individually lapped. The wafer has different bow characteristics imparted to different substrate work piece. The bow characteristic of the substrate work piece to be lapped is determined, load points are selected on the work piece which will counteract the bow characteristic, and a pusher with push pads located at the selected load points pushes the work piece at those load points so that the pushing flexes the substrate work piece to counteract the bow characteristic to lap the row edge. Upon completion of the lapping step, the row having the lapped row edge is sliced from the work piece to form a new row edge parallel to the lapped row edge, and, repeating the lapping process, the work piece is pushed by the push pads at the same selected load points, whereby, as the substrate is shortened, making said bow characteristic more pronounced, the pushing at the selected load points provides greater flex of the work piece to counteract the more pronounced bow.

24 Claims, 3 Drawing Sheets

LAPPING METHOD AND SYSTEM FOR COMPENSATING FOR SUBSTRATE BOW

Commonly assigned U.S. Pat. No. 4,689,877 is incorporated for its showing of a lapping system for lapping a row edge of a work piece comprising a row of magnetic transducers.

FIELD OF THE INVENTION

This invention relates to the lapping of magnetic transducer substrates, and, more particularly, to compensation for bow of a substrate work piece during lapping.

BACKGROUND OF THE INVENTION

Conventional thin film read/write heads in data storage systems generally include an inductive write head in combination with either an inductive or magnetoresistive (MR) read head. Typically, an MR/inductive head includes an inductive write head formed adjacent to an MR read head.

During the manufacturing of thin film heads, rows of magnetic recording transducers are deposited simultaneously on wafer substrates using semiconductor type process methods. Thin film heads are generally multi-layer heads that require depositions and pattern construction, of alternating layers of magnetic films, insulators, and conductors on top of a substrate wafer (ceramic wafer). The substrate wafer is then cut into rows of sliders such that the pole tips of the inductive write transducers and the magnetoresistive stripes of the magnetoresistive read transducers, which are arranged in a side-by-side relationship, extend to an edge of the row. The surface of the row edge is then lapped to the optimum dimensions of throat height and stripe height. When separated from the slider rows, each slider contains a magnetic read/write head and an air-bearing surface configured to aerodynamically "fly" over the surface of a spinning magnetic disk medium.

One approach to lapping a slider row is to slice the substrate into rows of magnetic transducers, and, as described in the incorporated '877 patent, each row may be cemented to a lapping fixture for holding the slider row in position over a lapping plate. The lapping plate provides an abrasive surface for accurately lapping the row edge to a final dimension. Pressure actuators are used to push the lapping fixture into contact with the lapping plate such that the row edge of the substrate now may be lapped. The '877 patent provides electrical lapping guides at two opposite ends of the slider row. The lapping guides are monitored to provide position measurements of each end of the lapped edge. Thus, the level of the lapped edge may be determined and corrective forces applied to the slider row by the pressure actuators to maintain the lapped edge level with respect to the final throat height dimension of the transducer row.

As disk drive technology advances, the dimensions of the transducers are continually decreasing, and the tracks recorded on the disks are becoming narrower and closer together. Thus, a magnetic transducer must be manufactured with greater precision to maximize its efficiency and sensitivity to read and write data.

Typically, the combined inductive write transducer and magnetoresistive read transducer are formed from adjacent layers so as to read and write on the same track. The production of the transducers includes a sequence of deposition and etching steps with the magnetoresistive transducer formed first, and the inductive write transducer formed on top of the magnetoresistive transducer. The magnetoresistive transducer typically includes a magnetoresistive stripe, the height of which is critical, and is determined by the height defining edge, which is the bottom edge of the stripe. The inductive transducer typically includes a bottom pole and a top pole, separated by a gap. The inductive transducer poles are narrowed to a very narrow pole tip having a precisely controlled width, or throat, the width of which defines the recorded track width. The height of the throat is also an important factor in the optimization of the inductive transducer.

The throat height of the inductive transducer must be maintained within a limited tolerance for generating an optimum magnetic signal from the input electrical signal. Furthermore, the stripe height of the magnetoresistive read transducer must be maintained within a limited tolerance so that the optimum change in resistance is generated in response to the sensed magnetic signal. The magnitude of the critical dimensions of the pole tip and the stripe heights is in the order of a micron.

When placed in a lapping fixture, the accumulated stresses on the substrate row (or slider row), together with the extremely small dimensions of the transducers, may increase the chance that not all the transducers in the slider row will be precisely aligned with the lapping edge. This condition is defined in coassigned U.S. Pat. No. 4,914,868 as "row bow". The '868 patent addresses row bow by using the magnetoresistive transducers in the row of transducers as resistive elements and measuring the resistance of the resistive elements to determine the magnetoresistive transducer stripe height. A lapping fixture includes a holder which has a slider row temporarily cemented thereon for lapping. The fixture deflects the holder from a flat dimension to an appropriate shape to lap the row of transducers to the optimum magnetoresistive transducer stripe height for each of the transducers along the row, as measured by the magnetoresistive transducer resistances.

Another approach to lapping a slider row is to lap the row edge of a single slider row before it is sliced from the wafer or a section of the wafer. Cost savings of this approach results from the elimination of the row bond process, where the entire wafer is sliced into individual rows and each row is bonded to a single steel lapping tool beam for lapping. In contrast, each wafer in the low cost process is cut into multiple rectangular arrays of rows, each array called a "work piece". Typically, each row contains an equal number of magnetic transducers. Each wafer may be cut into six rectangular arrays of rows or work pieces, with four large primary work pieces and two small secondary work pieces.

Each work piece is bonded to an extender, and loaded into a lapping fixture. As the work piece is processed, a row is lapped to the desired stripe height, then the row is sliced off, and the next row is lapped.

The work piece and extender is a rigid body, unlike the flexible row substrate described above. Thus, if there is any residual stress from the fabrication of the wafer within the work piece, the transducers in the slider rows can be forced into a non-planar configuration, resulting in a wide distribution of stripe heights along the slider row. The rigid body typically does not undergo the row bending similar to the single slider row in the manner described in the '868 patent.

The wafer fabrication process may also create a radial stress pattern within the wafer. Radially, the stress within the wafer is tensile at the center region, converting to compressive at the perimeter region. Therefore, depending on the location of each work piece on the wafer substrate prior to being sliced into work pieces and its orientation, it may experience curvature due to tensile stress, compressive stress, or both types of stress, imparting different bow characteristics to each work piece.

Throughout the production process, the work piece shortens as slider rows are lapped and then sliced off. As a result, the residual stress within the work piece becomes more apparent with the diminishing stiffness of the work piece, thereby causing higher standard deviation of stripe heights for the lapped row. Unfortunately, the lapping system does not compensate for the increased bow of the work piece as the work piece shortens during lapping.

SUMMARY OF THE INVENTION

A method and apparatus for lapping row edges of a work piece cut from wafer with a flat lapping element is described. The substrate work piece includes a portion of the wafer having parallel aligned multiple row edges to be individually lapped, and the wafer having different bow characteristics imparted to different work pieces due to the different residual stresses based on their original locations in the wafer. The bow characteristic of the work piece to be lapped is determined, load points are selected on the work piece which will counteract the bow characteristic, and a pusher with push pads located at the selected load points pushes the work piece at those load points so that the pushing flexes the work piece to counteract the bow characteristic to lap the row edge thereof. Upon completion of the lapping step, the row having the lapped row edge is sliced from the work piece to form a new row edge parallel to the lapped row edge, and, repeating the lapping process, the work piece is pushed by the push pads at the same selected load points, so that, as the work piece is shortened, making said bow characteristic more pronounced, the pushing at the selected load points provides greater flex of the work piece to counteract the more pronounced bow.

Alternatively, the work piece is not directly pushed by the push pads, but, rather, the push pads push a wafer extender which supports the work piece and causes the work piece to flex as the wafer extender flexes.

Alternatively, the wafer extender has at least one slot therein to increase the flexibility of the wafer extender.

For a fuller understanding of the present invention, reference should be made to the following detailed description taken in conjunction with the accompanying drawings.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 1:
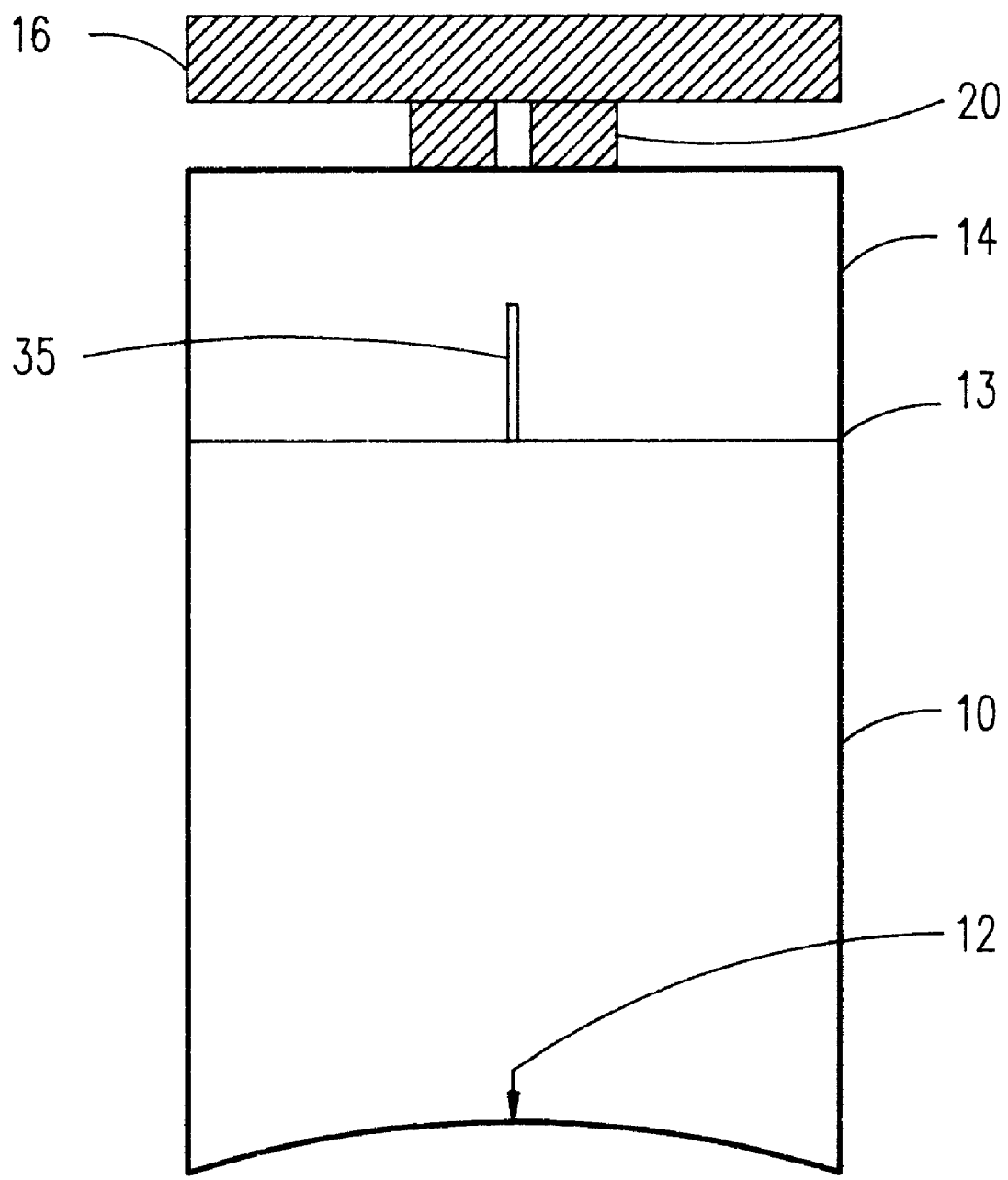
FIG. 1 is a diagrammatic representation of a substrate work piece and lapping fixture one embodiment of the present invention illustrating the bow characteristic of the work piece.
Figure 2:
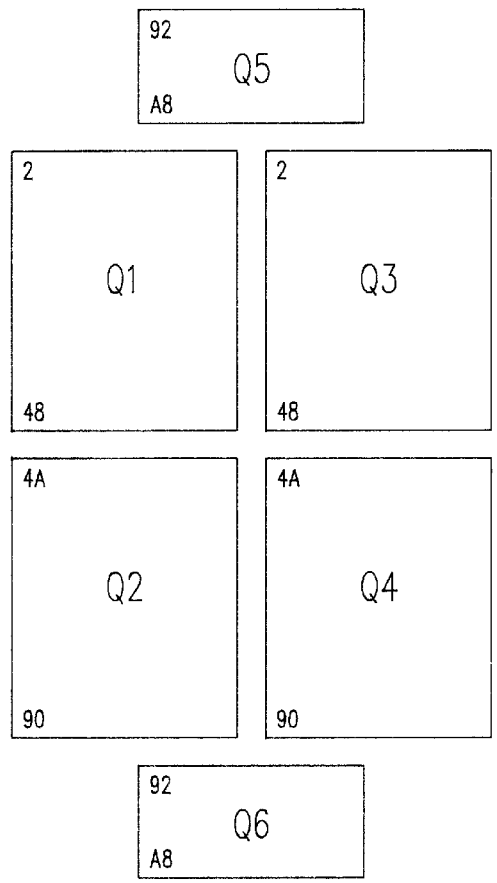
FIG. 2 is a diagram of the layout of work piece substrates from a wafer.

Referring to FIG. 1, a work piece 10 is illustrated, which is cut from a substantially rounded wafer for a lapping operation. For one embodiment, the work piece 10 maybe one of six rectangular arrays of slider rows cut from the wafer, designated as Q1 through Q6, as shown in FIG. 2. Each slider row of work piece 10 typically has an equal number of magnetic transducers. The six rectangular arrays of rows (work pieces) may include four large primary arrays and two small secondary arrays. For example, the large arrays may be about 60 mm in length and the small about 15 mm in length.

The wafer fabrication process typically creates a radial stress pattern within the wafer. Radially, the stress within the wafer is tensile at the center region, converting to compressive at the perimeter region. Therefore, depending on where each work piece Q1 through Q6 of transducers was partitioned or sliced from the wafer and its orientation, it may experience curvature due to tensile stress, compressive stress, or both types of stress, imparting different bow characteristics to each work piece.

As illustrated in an exaggerated manner in FIG. 1, work piece 10 has an edge 12 with considerable bow. As described above, the magnetic transducers require precise height dimensions that are determined by the lapping edge 12. For the inductive write transducer, the pole tip height dimension, commonly called throat height, must be maintained within a limited tolerance for generating an optimum magnetic signal from the input electrical signal. For the magnetoresistive read transducer, the stripe height must be maintained within a limited tolerance so that the optimum change in resistance is generated in response to the sensed magnetic signal. The magnitude of the pole tip and the stripe heights may be in the order of a micron.

As the work piece is processed during lapping, a slider row is lapped to the desired stripe height, then the slider row is sliced off, and the next row is lapped.

The stress of the work piece 10 is such that the resultant curvature of edge 12 may also be in the order of a micron or greater, resulting in an unacceptable distribution of heights. For one embodiment, the four large work pieces Q1 to Q4 of FIG. 2, are initially stiff enough to overcome the induced stress in the work piece during lapping. However, as the rows are sliced off and the work piece shortens, a noticeable pattern of stripe height distributions may be seen. This distribution widens progressively as the number of remaining slider rows for the work piece 10 decreases.

In the preferred embodiment, each work piece 10 is bonded at edge 13 to an extender 14, and loaded into a lapping fixture 16. The wafer extender 14 may be bonded with a conventional epoxy. The work piece 10 and extender 14 form a rigid body. Thus, if there is any residual stress within the work piece 10, the transducers in the slider row along edge 12 are forced into a non-planar configuration, resulting in lapping of edge 12 into a wide distribution of stripe heights along the slider row. When the majority of the slider rows on the work piece 10 have been lapped and sliced from the work piece 10, the edge 12 has the greatest deformation. At this point, the deformation is clearly noticeable on a micron scale, for example, 0.3 micron.

Because the bow deformation of edge 12 increases while processing (i.e., lapping and slicing) slider rows during lapping, it is necessary to offset, or counterbalance, the curvature of the slider rows with substantially the same magnitude.

Figure 3:
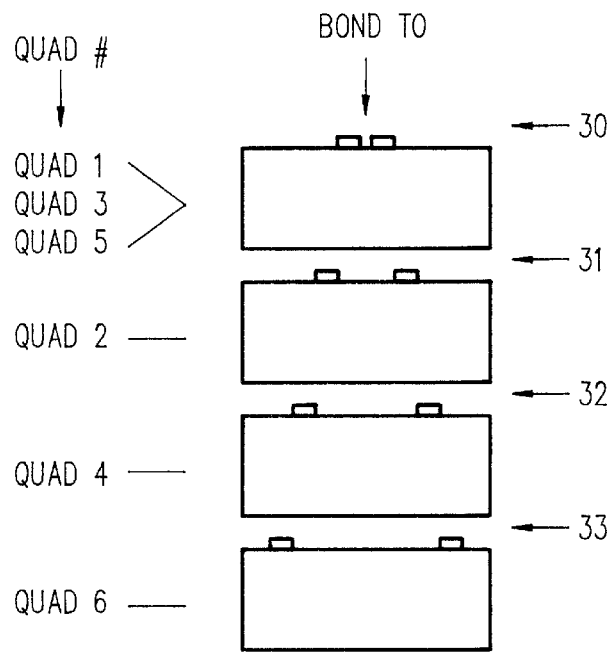
FIG. 3 is a diagram of different load points of the present invention for the work pieces of FIG. 2.

The necessary bow compensation is provided by applying the appropriate loads to the pusher pads 20. Hereinafter, pusher pads 20 may also be referred to as push pads or contact pads. Referring to FIG. 1, pusher pads 20 may be affixed to pusher bar 16 and affixed to wafer extender 14. Alternatively, the pusher pad may be affixed directly to the work piece 10. Furthermore, the pusher pads 20 may be positioned at different locations along the work piece edge opposite the lapping edge for the different work pieces, as shown in FIG. 3. For one embodiment, the wafer extender 14 may be made of titanium carbide which 47 mm wide. Push pads 20 may be about 1 mm by 1 mm and machined onto the wafer extender 14.

FIG. 3 illustrates different load points provided by the pusher pads 20. As described above, the wafer imparts different bow characteristics to different work pieces. Work pieces Q1, Q3 and Q5 are determined by testing, such as by measuring the bow at the final slider row of the work piece after the other slider rows have been sliced away, to require the greatest bow compensation at the center. Thus, the pusher pads 30 are positioned very closely together and centered along the work piece or wafer extender. As an example, pusher pads 30 may be located so as to be separated by a distance of 8 mm.

Work piece Q2 may be determined to have a bow characteristic less than that of work pieces Q1, Q3 or Q5. Thus, the load points for pusher pads 31 for work piece Q2 are selected to be at a separation greater than that-for pusher pads 30. As an example, pusher pads 31 may be centered and separated by a distance of 14 mm.

Work piece Q4 may be determined to have a bow characteristic different from that of work pieces Q1 through Q3, or that of Q5. Thus, the load points for pusher pads 32 for work piece Q4 will be more widely separated and closer to the outer edges of the work piece. As an example, pusher pads 32 may be centered and separated by a distance of 20 mm.

Lastly, work piece Q6 may be determined to have a bow characteristic requiring a greater separation than that of work piece Q4, and the load points selected for pusher pads 33 to be nearest the outer edge of the work piece or wafer extender. As an example, the pusher pads 33 may be centered and separated by a distance of 26 mm.

Thus, the steps for one embodiment may include determining the bow characteristic of the work piece, selecting load points on the work piece or wafer extender which will counteract the determined bow characteristic, and pushing the work piece at the selected load points against a flat lapping plate for lapping the row edge of the slider row to a desired level. By applying the appropriate loads to the pusher pads, the work piece is flexed to counteract the bow characteristic.

For an alternative embodiment a longitudinal slot 35 may be cut into the wafer extender 14 on the edge 13, as shown in FIG. 1. This cut 35, which for example may be one half the height of the wafer extender 14, "softens" or decreases the stiffness of the extender. It essentially reduces the effective cross-sectional area of the extender 14 which, in turn, reduces the stiffness of the extender 14.

Because the wafer extender 14 is bonded to the work piece 10 having slot 35, when the force from the pusher or contact pads 20 is applied to the center of the wafer extender 14, on a micron scale, the wafer extender 14 bends, transferring the applied force through the length of the work piece along its central region thereof.

Whether the pusher pads 20 push against the wafer extender 14 with the slot 35, against the wafer extender 14 without the slot, or directly against the work piece 10, the effectiveness of the pusher pads 20 positioned as described increases in effectiveness as the stiffness of the work piece decreases. Similarly, as the stiffness of the work piece decreases, the effect of the row curvature increases as the length of the work piece decreases. Thus, properly positioning the pusher pads 20 at a fixed position while lapping the work piece provides an increased offset compensation for the increase bow of the work piece as the work piece length decreases.

A preferred embodiment is to provide four different types of wafer extenders 14, having the push pads 20 affixed thereto or machined onto the wafer extender 14. The four different types have the push pads 20 affixed in the four different locations illustrated in FIG. 3. Upon determining the bow characteristic of a work piece, the appropriate wafer extender having the selected spacing, as shown by wafer extenders 30 through 33, is selected and bonded to the work piece for lapping.

Figure 4:
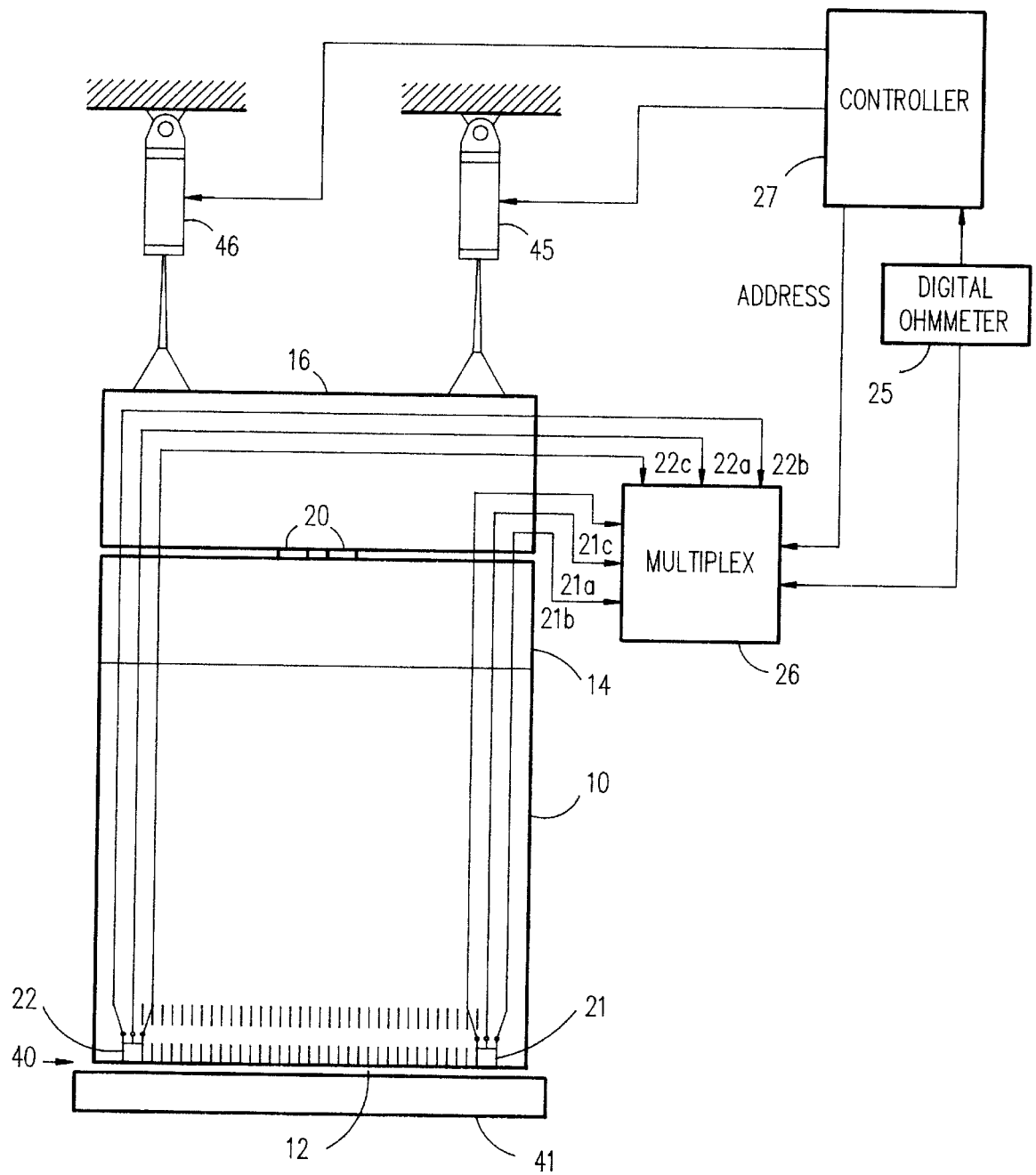
FIG. 4 is a diagrammatic representation of a lapping system of one embodiment of the present invention.

FIG. 4 illustrates a lapping apparatus which may be used with the lapping system and method of the present invention. The illustrated lapping apparatus is that of the incorporated '877 patent.

The lapping system is employed for lapping the edge 12 of work piece 10 to establish the precision stripe heights for the magnetic transducers 40 in a slider row. A lapping fixture, including pusher 16 holds the work piece 10, or the wafer extender 14 and work piece 10, in position over a lapping plate 41. Lapping plate 41 provides an abrasive surface for accurately lapping the surface of the edge 12 to a final dimension. The pusher pads 20 are positioned between the pusher 16 of the lapping fixture and the wafer extender 14 in the location determined by the present invention.

The force applied to the pusher 16 may be applied by first and second pressure actuators 45 and 46. Varying the force applied by the actuators 45 and 46 against work piece 10 controls the leveling of the lapped surface of edge 12.

The deviations from a level surface are measured from electrical lapping guides 21 and 22. Electrical lapping guides 21 and 22 provide signals that indicate the distance lapped to identify the position of the plane of the lapped surface of edge 12 with respect to the desired final dimension of the transducers 40. These electrical signals from the electrical lapping guide 21 and 22 are received by the digital ohmmeter 25 through a multiplexer 26. Digital ohmmeter 25 measures the resistance of each electrical lapping guide 21 and 22. Controller 27 uses the resulting resistance measurements to determine the position of the lapped surface of row edge 12 with respect to the right and left ends of work piece 10 and activates the actuators 45 and 46 to level the transducers 40 in the slider row relative to the lapping plate 41. Thus, the lapping system ensures that the stripe heights of all of the transducers in a slider row 40 are substantially the same.

For another embodiment, sensors may be used in addition to the electrical lapping guides 21 and 22. For example, as taught by the cited '868 patent, the transducers 40 may be used as sensors for controlling the lapping of the row edge 12.

Other types of lapping systems may equally well be employed to conduct the lapping of the work piece 10 in accordance with the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for lapping row edges of a substrate work piece with a flat lapping element, said substrate work piece comprising a section of a wafer and having parallel aligned multiple row edges to be individually lapped, said wafer having different bow characteristics imparted to different said substrate work pieces at different locations and orientations of said substrate work pieces on said wafer, comprising the steps of:

(a) determining the bow characteristic of said substrate work piece from said location and orientation of said substrate work piece on said wafer;

(b) selecting pusher pad load points on said substrate work piece which will counteract said bow characteristic; and (c) pushing said work piece at said selected pusher pad load points against said flat lapping element for lapping said row edge thereof to a desired level.

2. A method for lapping row edges of a substrate work piece with a flat lapping element, said substrate work piece comprising a section of wafer having parallel aligned multiple row edges to be individually lapped, said wafer having different bow characteristics imparted to different said substrate work pieces, comprising the steps of:

(a) determining the bow characteristic of said substrate work piece;

(b) selecting pusher pad load points on said substrate work piece which will counteract said bow characteristic;

(c) pushing said work piece at said selected pusher pad load points against said flat lapping element for lapping said row edge thereof to a desired level;

(d) upon completion of said lapping step, slicing the row having said lapped row edge to form a new row edge parallel to said lapped row edge; and (e) repeating step (c), pushing said substrate work piece at the same said selected pusher pad load points, whereby, as said substrate work piece is shortened, making said bow characteristic more pronounced, said pushing at said selected pusher pad load points provides greater flex of said substrate work piece to counteract said more pronounced bow.

3. The method of claim 2, additionally comprising the step of:

(f) upon completion of lapping all of said row edges of said substrate work piece, repeating steps (a) through (e) for another said substrate work piece.

4. The method of claim 3, wherein said repeating step (f) additionally comprises the step of:

(g) dynamically adjusting said pusher pad load points to said newly selected load points.

5. The method of claim 2, wherein said substrate work piece is supported by a wafer extender, and wherein:

(b)(1) said selecting step comprises selecting pusher pad load points on said wafer extender which will counteract said substrate bow characteristic; and (c)(1) said pushing step comprises pushing said wafer extender at said selected pusher pad load points to thereby push said substrate work piece against said flat lapping element.

6. A lapping system for lapping row edges of a substrate work piece, said substrate work piece comprising a section of wafer and having parallel aligned multiple row edges to be individually lapped, said wafer having different bow characteristics imparted to different said substrate work pieces at different locations and orientations of said substrate work pieces on said wafer, comprising:

a flat lapping element; and pusher pads positioned to push said substrate work piece against said lapping element, said pusher pads located at load points of said substrate work piece which flex said substrate work piece so as to counteract said bow characteristic, said bow characteristic of said substrate work piece determined from said location and orientation of said substrate work piece on said wafer.

7. A method for lapping row edges of magnetic transducers deposited in rows on a slider substrate work piece with a flat lapping element, said substrate work piece comprising a section of wafer having parallel aligned multiple row edges of said magnetic transducers to be individually lapped, said wafer having different bow characteristics imparted to different said substrate work pieces, and having predetermined load points on said substrate work piece which will counteract said bow characteristic, comprising the steps of:

(a) providing pusher pads at said predetermined load points;

(b) pushing said substrate work piece with said pusher pads at said selected load points against said flat lapping element for lapping said row edge magnetic transducers thereof to a desired level, so that said pushing flexes said substrate work piece to counteract said bow characteristic;

(c) upon completion of said lapping step, slicing the row having said lapped row edge to form a new row edge parallel to said lapped row edge; and (d) repeating step (b), pushing said substrate work piece with said pusher pads at the same said selected load points, whereby, as said substrate work piece is shortened, making said bow characteristic more pronounced, said pushing at said selected load points provides greater flex of said substrate work piece to counteract said more pronounced bow.

8. The method of claim 7, wherein said substrate work piece is supported by a wafer extender, and wherein said predetermined load points are provided on said wafer extender which will counteract said substrate bow characteristic, and wherein:

(b) said pushing step comprises pushing said wafer extender at said selected load points to thereby push said substrate work piece against said flat lapping element.

9. In a lapping system for lapping row edges of magnetic transducers deposited in rows on a slider substrate work piece with a flat lapping element, said substrate work piece comprising a section of wafer and having parallel aligned multiple row edges of said magnetic transducers to be individually lapped, said wafer having different bow characteristics imparted to different said substrate work pieces at different locations and orientations of said substrate work pieces on said wafer, a lapping fixture comprising:

a pusher positioned to push said substrate work piece against said lapping element; and pusher pads between said pusher and said substrate work piece located at load points of said substrate work piece which flex said substrate work piece so as to counteract said bow characteristic, said bow characteristic of said substrate work piece determined from said location and orientation of said substrate work piece on said wafer.

10. The method of claim 8, additionally comprising the step of:

(e) upon completion of lapping all of said row edges of said substrate work piece, repeating steps (a) through (d) for another said substrate work piece.

11. The method of claim 10, wherein said repeating step (e) additionally comprises the step of:

(f) dynamically adjusting said load points to said newly selected load points.

12. The method of claim 8, comprising the additional preliminary step of:

(a)(1) providing at least one slot in said wafer extender to thereby increase the flexibility thereof.

13. A lapping system for lapping row edges of a substrate work piece, said substrate work piece comprising a section of wafer having parallel aligned multiple row edges to be individually lapped, said wafer having different bow characteristics imparted to different said substrate work pieces, comprising:

a flat lapping element;

pusher pads positioned to push said substrate work piece against said lapping element, said pusher pads located at load points of said substrate work piece which flex said substrate work piece so as to counteract said bow characteristic; and a wafer extender supporting said substrate work piece and pushed by said pusher pads at load points of said extender, flexing said wafer extender and said supported substrate work piece so as to counteract said bow characteristic.

14. The lapping system of claim 13, wherein said pusher pads are fixed at said load points for lapping all rows of said substrate work piece.

15. The lapping system of claim 14, wherein said pusher pads are fixed at different load points for said substrate work pieces having different bow characteristics.

16. The lapping system of claim 13, wherein said wafer extender has at least one slot to increase the flexibility of said wafer extender.

17. The lapping system of claim 16, wherein said pusher pads are fixed at said load points for lapping all rows of said substrate work piece.

18. The lapping system of claim 17, wherein said pusher pads are fixed at different load points for said substrate work pieces having different bow characteristics.

19. In a lapping system for lapping row edges of magnetic transducers deposited in rows on a slider substrate work piece with a flat lapping element, said substrate work piece comprising a section of wafer having parallel aligned multiple row edges of said magnetic transducers to be individually lapped, said wafer having different bow characteristics imparted to different said substrate work pieces, a lapping fixture comprising:

a pusher positioned to push said substrate work piece against said lapping element;

pusher pads between said pusher and said substrate work piece located at load points of said substrate work piece which flex said substrate work piece so as to counteract said bow characteristic; and a wafer extender supporting said substrate work piece pushed by said pusher pads to push said substrate work piece against said lapping element for lapping said substrate work piece, said pusher pads located at load points of said wafer extender which flex said wafer extender and counteract said bow characteristic.

20. The lapping fixture of claim 19, wherein said pusher pads are fixed at said load points for lapping all rows of said substrate work piece.

21. The lapping fixture of claim 20, wherein said pusher pads are fixed at different load points for said substrate work pieces having different bow characteristics.

22. The lapping fixture of claim 19, wherein said wafer extender has at least one slot therein to thereby increase the flexibility thereof.

23. The lapping fixture of claim 22, wherein said pusher pads are fixed at said load points for lapping all rows of said substrate work piece.

24. The lapping fixture of claim 23, wherein said pusher pads are fixed at different load points for said substrate work pieces having different bow characteristics.

* * * * *